United States Patent [19]
Floe

[11] Patent Number: 6,068,282
[45] Date of Patent: *May 30, 2000

[54] TONGUE RETENTION AND RELEASE MECHANISM

[76] Inventor: Wayne G. Floe, HCR 4 Box 131, McGregor, Minn. 55760

[*] Notice: This patent issued on a continued prosecution application filed under 37 CFR 1.53(d), and is subject to the twenty year patent term provisions of 35 U.S.C. 154(a)(2).

[21] Appl. No.: 09/063,564

[22] Filed: Apr. 21, 1998

Related U.S. Application Data

[62] Division of application No. 08/559,360, Nov. 16, 1995, Pat. No. 5,775,711.

[51] Int. Cl.[7] ..................................................... B60D 1/155
[52] U.S. Cl. ........................ 280/482; 280/491.2; 24/569; 403/362
[58] Field of Search ............................ 280/405.1, 478.1, 280/491.2, 482, 506; 24/522, 527, 528, 529, 569; 403/362, 379

[56] References Cited

U.S. PATENT DOCUMENTS

| | | | |
|---|---|---|---|
| 1,763,128 | 6/1930 | Bolland | 24/569 |
| 2,092,593 | 9/1937 | Seys | 24/522 |
| 2,569,843 | 10/1951 | Adler et al. | 24/569 |
| 2,856,204 | 10/1958 | Graham | 280/491.2 |
| 2,933,567 | 4/1960 | Maceoch | 24/569 |
| 2,990,458 | 6/1961 | Mageoch | 24/569 |
| 3,385,610 | 5/1968 | Vezina | 280/482 |
| 4,062,519 | 12/1977 | Jacobs | 24/569 |
| 5,593,172 | 1/1997 | Breslin | 280/506 |
| 5,662,427 | 9/1997 | Chen | 403/362 |
| 5,735,539 | 4/1998 | Kravitz | 280/506 |

*Primary Examiner*—Kevin Hurley
*Attorney, Agent, or Firm*—Charles A. Johnson

[57] ABSTRACT

An improved tilt-bed trailer constructed of light weight and durable materials is disclosed. A trailer frame with an associated rotatably interconnected tongue is affixed with a tongue release and retention mechanism that slidably engages a portion of the tongue and a portion of the frame to hold them in a fixed position when engaged and to allow the frame to pivot with respect to the tongue when disengaged. The mechanism utilizes gripping members to cooperate with ridges on the tongue.

11 Claims, 5 Drawing Sheets

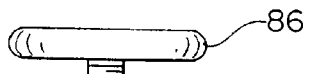
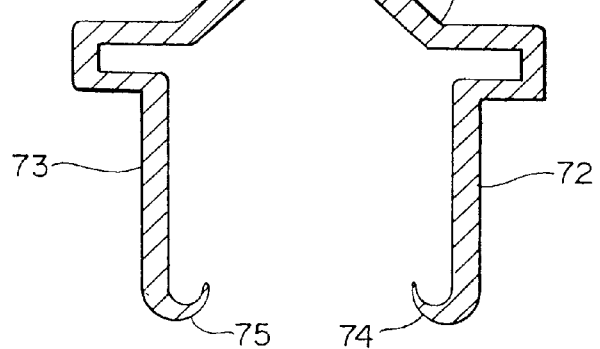
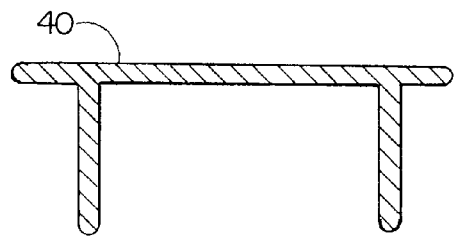
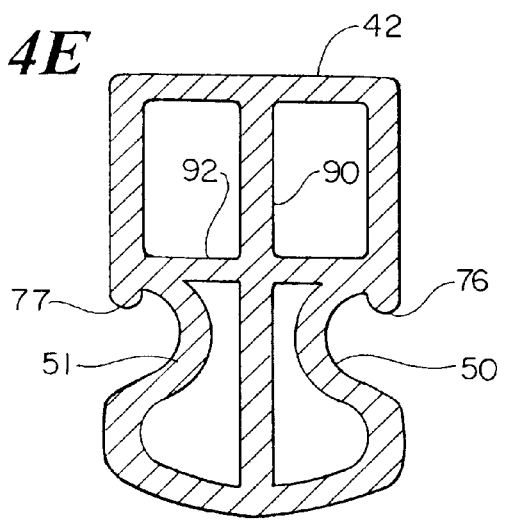

TONGUE RETENTION AND RELEASE MECHANISM

This application is a Division of Ser. No. 08/559,360, filed Nov. 16, 1995, now U.S. Pat. No. 5,775,711.

BACKGROUND OF THE INVENTION

1. Field of the Invention

This invention relates generally to trailer structures; and, more particularly, to tiltable trailers having an improved tongue retention and release structure.

2. State of the Prior Art

Various structures for trailers that are to be towed behind vehicles are known. One class of trailer structures that have special requirements is the class of trailers that are used to transport various recreational vehicles such as snowmobiles, all terrain vehicles, lawn care equipment, tractors, or the like. Many such vehicles are ground-driven and for ease of loading, it has been found beneficial to provide a trailer bed that tilts. Generally, these trailers are supported on two wheels, are preferably constructed of strong but light weight material, and have a wood bed. Various forms of ramps and tilt beds are known. Trailer beds are alternatively referred to as trailer decks.

Various forms of tilt bed trailers have been disclosed. Such tilt bed trailers have utilized various complex release mechanisms to release the bed from the tongue to allow the bed to rotate and tilt for loading and unloading of vehicles. U.S. Pat. No. 4,222,698 issued to Stuart R. Boelter illustrates a mechanism for adjusting the relative angular position of structures adapted to support a snowmobile. Yet another tilt bed trailer for snowmobiles is described in U.S. Pat. No. 3,885,690 issued to James J. Van and Slambrouck, and illustrates the use of a release lever and detent to free the bed of the trailer to tilt relative to the tongue. U.S. Pat. No. 5,421,612 issued to me described a tilt bed trailer that utilizes a support channel in cooperation with a novel tongue structure to allow the bed supporting frame to tilt. Other types of tilt bed trailers are known in the prior art.

The various structures utilized to retain the tilt bed affixed to a trailer tongue have been found to be relatively complex to manufacture and assemble, in many cases unreliable, and often lacking in ease of use in releasing the bed for tilting.

It has been known in the prior art to construct frame members from bent and formed structural members. The use of steel in fabricating the trailer frames has been shown to be unduly heavy and subject to rusting and corrosion and additional maintenance. More recently it has been known to utilize aluminum in the construction of frame members, and it has been known to utilize extruded aluminum to create predetermined shapes of members that can then be cut to desired length and formed into a trailer frame.

While versatility has been found in the use of extruded aluminum members, there has remained the problem requiring separate types of members for various sizes and capacities of trailers. The construction of prior art trailers has often required the use of precision drilling to allow joining members together or has required welding for structural rigidity. These construction processes do not lend themselves to versatility in use of various members in the positioning and adjustment of location. For example, the structures to mount the axle to the frame has characteristically been fixed for each trailer type and the capacity, and has required different structures to accommodate the mounting. Further, once constructed, such fixed axle mounts do not readily accommodate any adjustments or modifications for differing uses of the trailer.

OBJECTS

It is a primary objective of the invention to provide an improved trailer structure.

Yet another object is to provide an improved tilt bed trailer frame.

A further object is to provide an improved retaining and release structure for releasably attaching the bed of a trailer to the tongue to allow tilting of the trailer bed when released.

Still another object is to provide an improved adjustable axle mounting structure.

Another object of the invention is to provide a light weight and corrosion resistant trailer frame that utilizes slidable mating parts for retention, release, and adjustment.

Still a further object of the invention is to provide an improved trailer frame constructed of members that are fabricated from extruded aluminum that has the required strength while being light weight and substantially maintenance free.

These and other more detailed of the specific objectives will become apparent from consideration of the following description of the invention.

SUMMARY OF THE INVENTION

The present invention includes a light weight aluminum trailer frame structure with an improved tongue retention and release mechanism to hold an associated trailer bed supporting frame structure firmly in contact with a trailer tongue when engaged, and to allow the bed support structure to rotate and tilt when released. The tongue retention and release mechanism comprises a clamping structure having downwardly extending and parallelly disposed gripping members for engaging cooperating ridges on the tongue, together with a pressure member mounted there between. The entire mechanism encloses a portion of a tongue channel that is fixedly attached to the trailer bed support structure. A hand operable clamp bolt passes through the pressure member and engages a threaded nut and is operable to apply upward pressure on the entire mechanism when pressure is applied to the top of the tongue channel, thereby holding the mechanism firmly in place and preventing the trailer bed from tilting. When released, the mechanism can be slidably removed along the tongue away from engaging the tongue channel, thereby permitting the trailer bed to tilt.

BRIEF DESCRIPTION OF THE DRAWING

FIG. 4A through FIG. 4E collectively are an exploded cross-sectional view of the tongue, wherein FIG. 4A illustrates a threaded pressure device, FIG. 4B illustrates a gripping member, FIG. 4C is a nut for cooperation with the pressure device of FIG. 4A, FIG. 4D is a channel member to be slidably engaged with the gripping device of FIG. 4B, and FIG. 4E is the tongue; retention and release mechanism, the tongue retention channel, and the tongue;

DESCRIPTION OF THE PREFERRED EMBODIMENT

Figure 1:
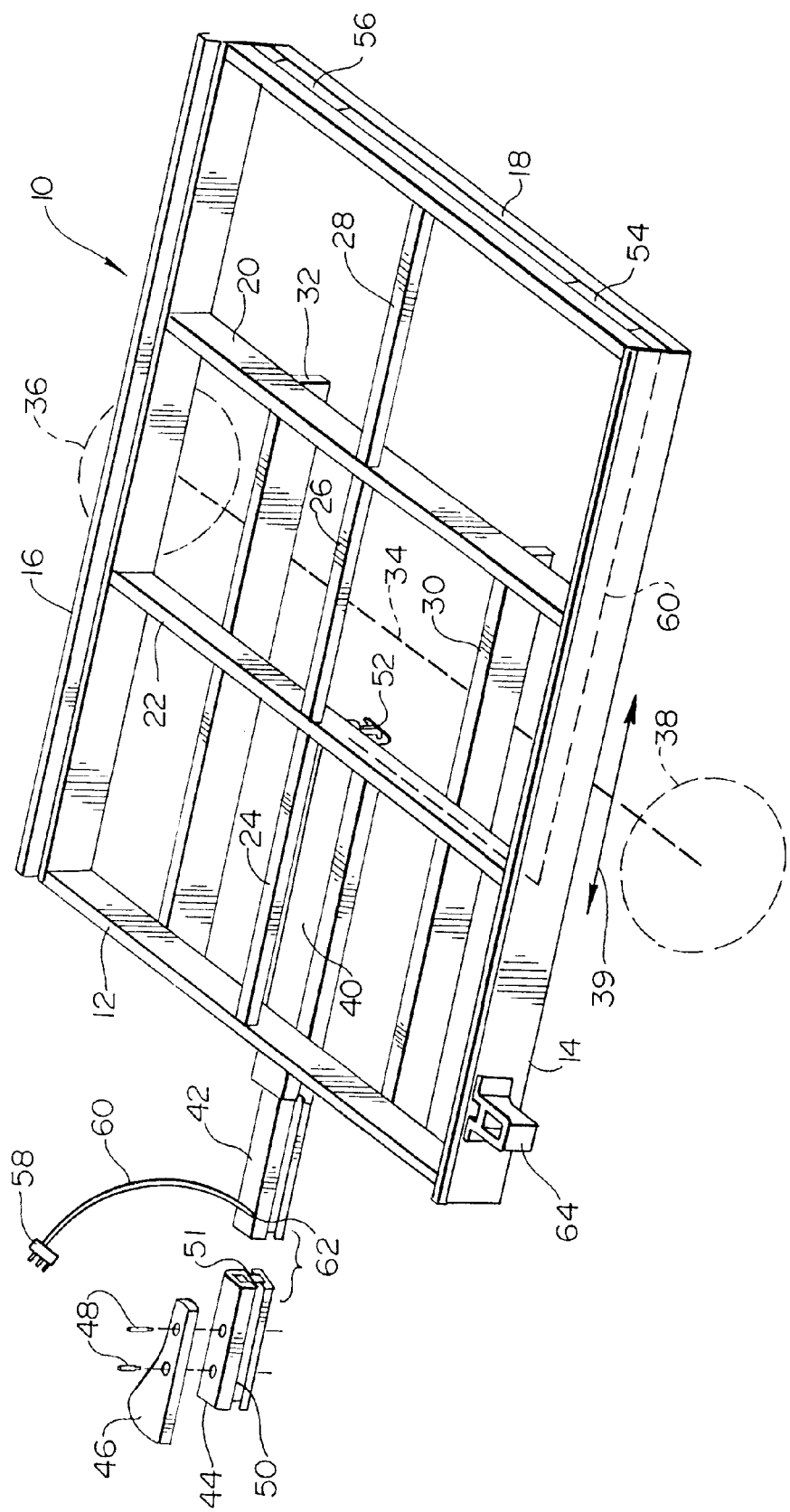
FIG. 1 is a perspective view of a trailer frame and associated tongue.

FIG. 1 is a perspective view of a trailer frame and associated tongue having a pair of channels disposed at opposite sides and running longitudinally. The trailer frame 10 is made up of front beam 12, side panels 14 and 16, and rear channel member 18, each of which has a deck support portion. A pair of cross beans 20 and 22 are spaced front-to-back by spacers 24, 26 and 28. A pair of frame support members 30 and 32 are positioned parallel to one another and are arranged longitudinally to side support panels 14 and 16. These support members 30 and 32 are arranged for providing support to the entire frame 10 on an axle, represented by dashed line 34, and on a pair associated wheels shown as dashed lines 36 and 38. As will be described in more detail below, support members 30 and 32 cooperate with slidable mounting structures (not shown in FIG. 1) to allow slidable adjustment of the axle 34 either forwardly or rearwardly of the frame, as illustrated by arrow 39. This configuration of the trailer frame 10 is illustrative only, and various other configurations of members can be utilized as necessary to serve various uses, size considerations, and strength requirements.

A generally channel shaped member 40 is arranged to cooperate with a portion of tongue 42 and is located and affixed to the undersides of front beam 12 and cross beam 22, and is utilized for providing a vertical span support, as well as a lateral support for tongue 42.

The front end 44 of tongue 42 is adapted to have a hitch 46 attached as by bolts (not shown) extended through holes aligned on dashed lines 48. Tongue 42 has longitudinal opposed channels 50 and 51 extending along at least a portion of its length.

For fixed tongue trailer frames, channel 40 would be firmly affixed to tongue 42, as by bolts, welding, or other suitable interconnection. For those trailer frames that are characterized as tilt bed, end 52 of tongue 42 is pivotally mounted (not shown) to the tongue mount 40 near end 52. A releasable tongue catch (not shown in FIG. 1) is mounted forward of front beam 12 and operates to releasably couple tongue 42 within channel 40. When the tongue catch is released, trailer frame 10 is allowed to rotate about axle 34 in a clockwise direction until the bottom of rear channel 18 touches the surface, thereby allowing a snowmobile or other vehicle to drive onto or off of the trailer. Once weight is placed forward on the trailer, the frame rotates back until channel 40 reengages tongue 42 and the tongue clamp is utilized to hole the tongue in place. The tongue clamp will be described below. While channel 40 is shown to have a planar top until a pair of downwardly extending side members, it should be understood that various other configurations could be utilized with tongues of differing cross-sections, or to achieve some other structural goal.

Rear channel 18 has a pair of tail lights 54 and 56 mounted within the channel, so that the lights are protected from breakage or damage during loading. Electric power is provided from the tow vehicle through plug 58 and cable 60. Cable 60 extends through hole 62 in the top of tongue 42 and runs inside tongue 42 toward end 52. The cable 60 then is run inside beams 22 and 14 to the rear where electrical connection is made to lights 54 and 56. Running cable 60 inside the tongue and the beams protects it from damage and breakage. An alternative connection for cable 60 can be provided. The cable can be extended out through end 52 and attached externally to the underside of spacers 26 and 28, and extended to the back of end channel 18. Either interconnection will function. Various other electrical wiring configurations can be utilized.

A desired number of stake holders such as stake holder 64, can be mounted at desired points along side panels 14 and 16.

The tongue 42, end channel member 18, tongue channel 40, side panels 16, stake holder 64, and the beams are all fabricated from aluminum. The beams and spacers are all adapted to support a trailer deck (not shown) that characteristically will be constructed of plywood or some other suitable material. The aluminum members are fabricated by heating and formed by extruding to the desired shapes, and are joined together by welding or by corrosion resistant fastener devices as needed. The extrusion process provides members that are strong and are not stressed by bending and forming processes. The extruded structures are cut to length for the size trailer framer desired, thereby providing an efficient and cost-effective manufacturing process.

Figure 2:
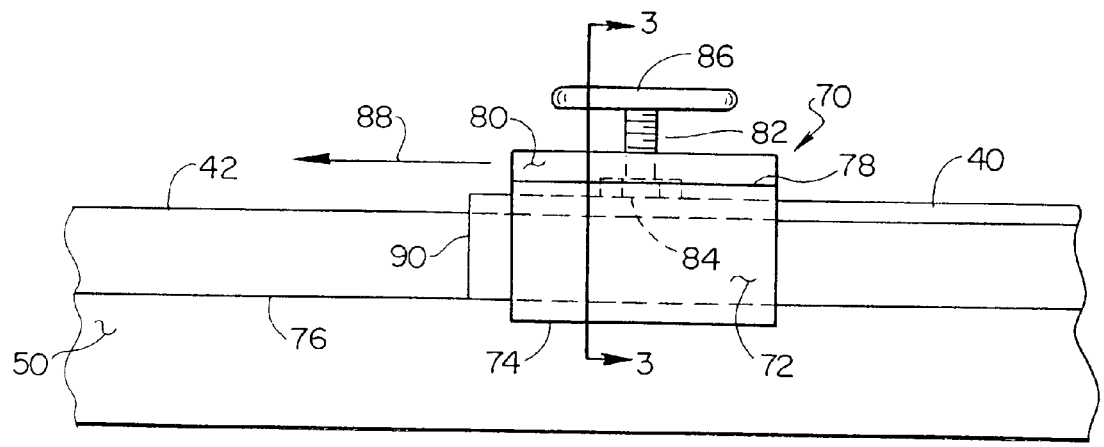
FIG. 2 is a side view of the tongue retention and release mechanism.

FIG. 2 is a side view of the tongue retention and release mechanism. This illustrates tongue clamping and release mechanism 70 positioned in an operative relationship with channel member 40 and tongue member 42. Downwardly extending gripping member 72 has a lower gripping portion 74 in cooperative relationship with a ridge 76 on the tongue member. At its upper extremity 78 there is a shoulder that cooperates with the upper pressure member 80. A hand operated tension bolt 82 cooperates with a threaded nut 84 to operate in a manner to apply pressure to the upper surface of channel 40 when the handle 86 is operated. When pressure bolt 82 is released, the entire mechanism 70 can be moved in the direction of arrow 88 to a position where the end 90 of channel member 40 is cleared. At that juncture, tongue 42 is free from restraint to channel member 40 and the associated trailer bed (not shown) is then free to tilt.

Figure 3:
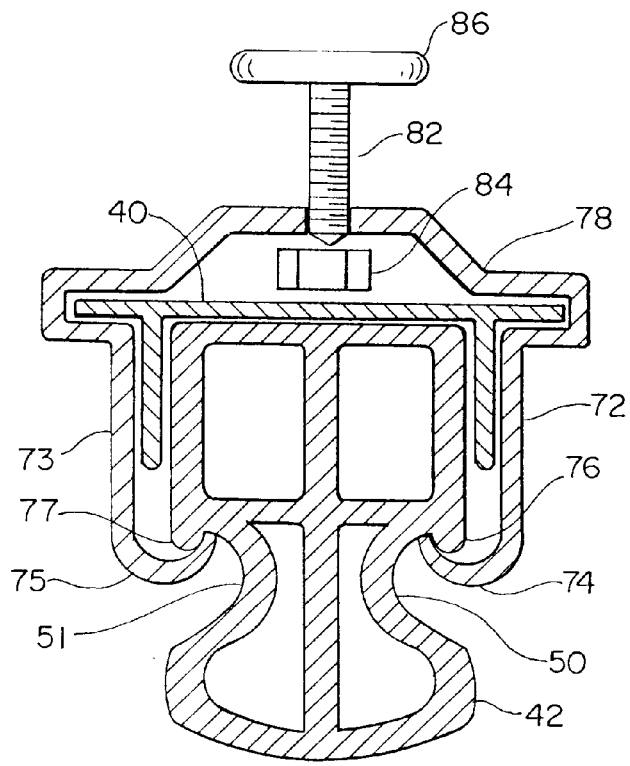
FIG. 3 is a cross-sectional view of the tongue retention and release mechanism taken at line 3—3 in FIG. 2.

FIG. 3 is a cross-sectional view of the tongue retention and release mechanism taken at line 3—3 in FIG. 2. The tongue 42 has longitudinal channels 51 and 52. Downwardly extending gripping members 72 and 73 are essentially parallelly disposed and have gripping members 74 and 75 associated therewith respectively. The gripping members 74 and 75 cooperate with ridges 76 and 77 on tongue structure 42. When bolt 82 is turned into nut 84 and impinges the top of channel member 40, nut 42 will be drawn into relationship with pressure member 80 and will provide an upward pressure to gripping members 74 and 75 while providing a downward pressure on the channel member 40. This pressure relationship will hold the tongue retention and release mechanism firmly in place and prevent tongue 42 from being able to move with respect to channel member 40.

FIG. 4A through FIG. 4E are collectively an exploded cross-sectional view of the tongue retention and release mechanism, the tongue retention channel, and the tongue. This exploded set of views illustrates the cross-sectional configurations of the components and members described with reference to FIG. 3. With the exception of the tension bolt 82 and its associated nut 84, the structural elements are fabricated from extruded aluminum to provide a light weight, maintenance free, and strong structures that can be readily fabricated. For additional strength, tongue 42 has a predetermined configuration of internal vertical support 90 and horizontal structural support 92.

Figure 5:
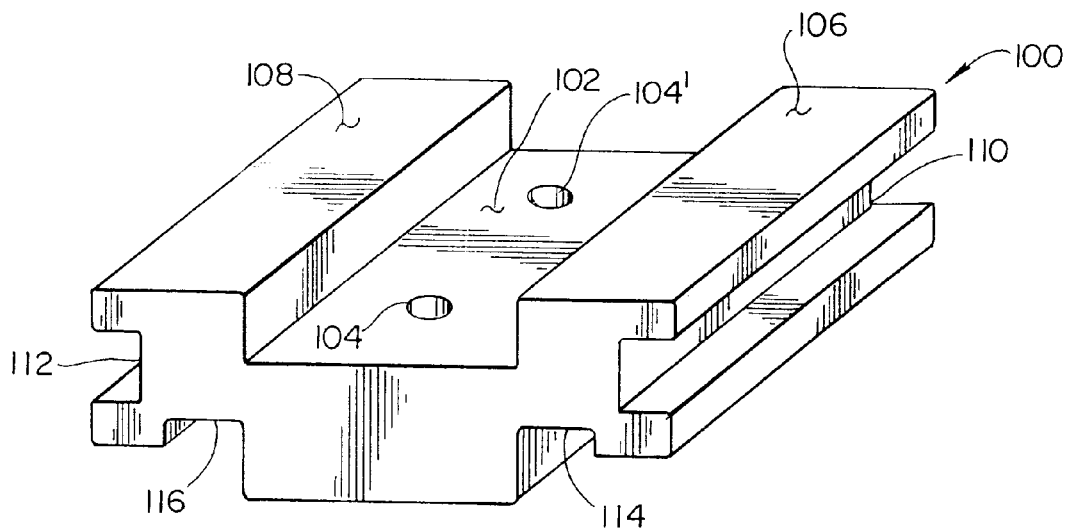
FIG. 5 is a three-dimensional view of a slidable axle support member.

FIG. 5 is a three-dimensional view of a slidable axle support member. The axle support member 100 is comprised of an extruded structure that is integrally formed having a central portion 102 with bolt holes 104 and 104' therein. The bolt holes are utilized to receive the bolts (not shown) that affix the axle 34 (see FIG. 8). A pair of longitudinal engaging members 106 and 108 are formed at the sides of the center portion 102, and are formed with longitudinal channels 110 and 112, respectively. Members 106 and 108 also form longitudinal channels 114 and 116 respectively. Channels 110, 112, 114, and 116 are configured to mate with protrusions in the associated ones of the support beams that will be described below.

Figure 6:
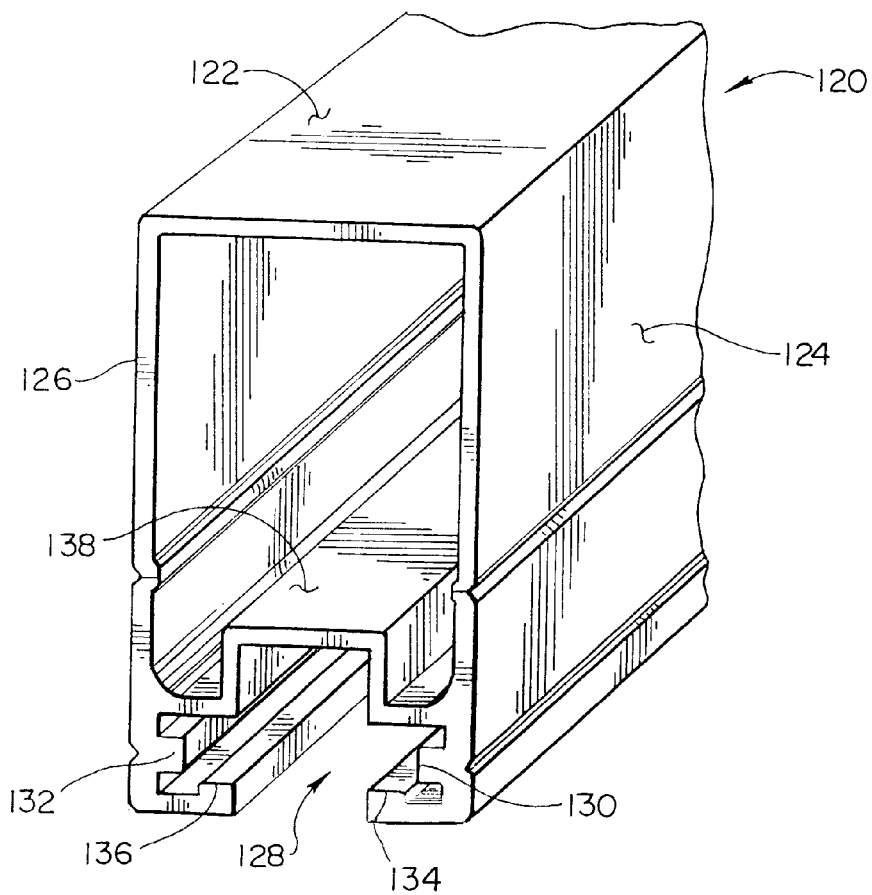
FIG. 6 is a three-dimensional view of a portion of the longitudinal support member with the predetermined longitudinal channel for engaging the slidable axle support member.

FIG. 6 is a three-dimensional view of a portion of the longitudinal support member with the predetermined longitudinal channel for engaging the slidable axle support member. In FIG. 1 the support members are shown as members 30 and 32. A portion of one of the support members 120 includes an upper surface 122 and side surfaces 124 and 126. At the lower extremity a longitudinal channel illustrated by arrow 128 extends longitudinally along the base of support member 120. The channel 128 is configured to include a number of longitudinal protrusions 130, 132, 134, and 136 to mate with and provide slidable contact with the longitudinal channels 110, 112, 114, 116, respectively, in the associated axle mount structure 100. Channel 128 is enclosed at the top thereof by a longitudinal portion 138.

In a preferred embodiment the width of support member 120 is nominally 2 inches, the height is nominally 3.5 inches, and the lower exposed width of channel 128 is approximately 0.783 inch. As stated, the length of support member 120 can be selected as desired for the type of trailer being utilized.

Figure 7:
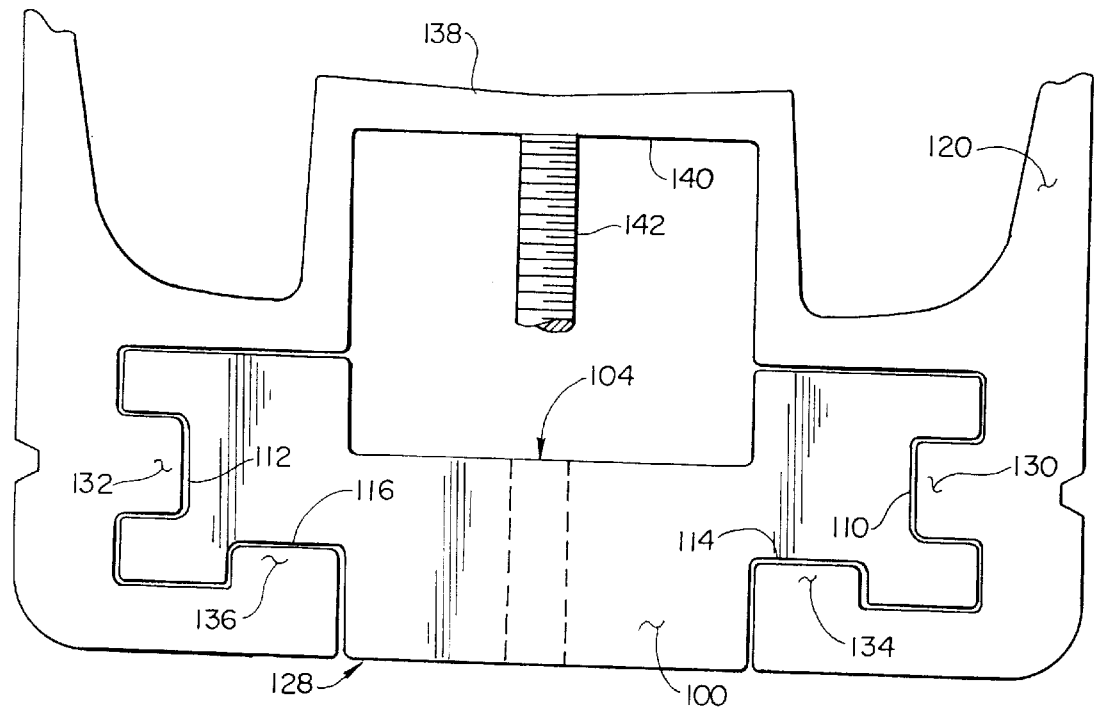
FIG. 7 is an end view of the slidable axle support member slidably engaged within the configured longitudinal channel of the support member.

FIG. 7 is an end view of the slidable axle support member slidably engaged within the configured longitudinal channel of the support member. This illustrates the axle support member 100 in slidable contact within longitudinal channel 128 of support member 120. Upper surface 138 is slightly concave. This concave structure in conjunction with the design of the configured channel is operable as part of the locking mechanism to lock the axle support member in place when its longitudinal placement selection is made. When the axle 34 and the axle brackets (not shown in FIG. 7) are affixed to the under surface of axle support member 100 by passing bolts 142 upward through apertures 104 and 104'. The bolts are selected of sufficient length such that when inserted to impinge on the lower surface 140 and with the exertion of upward pressure the member is caused to slightly deflect. This deflection produces a torque force along the members forming channel 128, and causes the protrusions 130 and 132 to be urged inwardly respectively, and protrusions 134 and 136 to be urged inwardly and upwardly respectively. This clamping action in conjunction with the pressure of bolt 142 and the second bolt (not shown) causes the axle support member 110 to be firmly locked into place.

Figure 8:
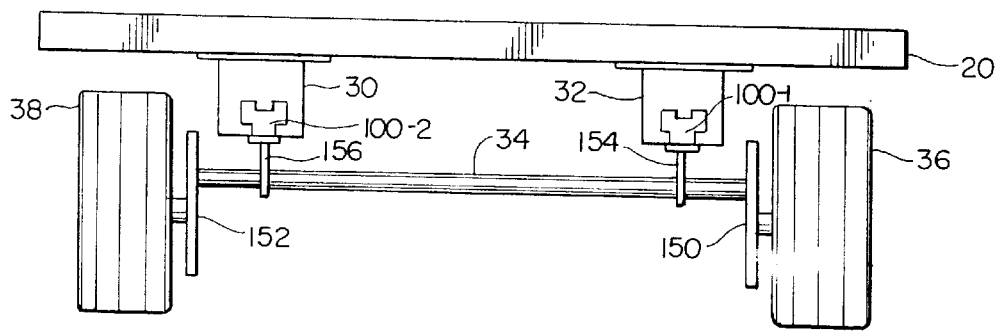
FIG. 8 is a rear view of a wheel and axle assembly mounted to an adjustable axle support mechanism.

FIG. 8 is a rear view of a wheel and axle assembly mounted to an adjustable axle support mechanism. Here it can seen that axle 34 is not centered on tires 36 and 38, but rather is affixed at its ends to mounting elements 150 and 152, respectively, to provide a high clearance for axle 34. Axle mounting brackets 154 and 156 are bolted to axle mounting devices 100-1 and 100-2 respectively.

From the foregoing description it can be seen that the extruded bed support members can be adapted to various lengths for differing size trailers or differing configurations of deck support structures. Thereby greatly simplifying the manufacturing processes and simplifying the supply of materials for spare parts.

Having described the preferred embodiment of the invention in conjunction with the drawings, it can be seen at the various stated purposes and objectives have been achieved, and that there is modifications and extensions will be become apparent to those skilled in the art within the spirit and scope of the invention. Accordingly, what is attended to be protected by Letters Patent is set forth in the appended claims.

I claim:

1. A tilt-bed trailer having a frame, an elongated tongue member having ridges along at least a portion of its length and rotatably coupled at one end to said frame, and an improved tongue retention and release mechanism comprising:

a channel member mounted to said frame and arranged to cooperate with a portion of said elongated tongue;

a gripper mechanism slidably engaging said channel member and cooperating with said ridges on said elongated tongue member; and a selectively actuatable pressure device coupled to said gripper mechanism and having a first position capable of applying pressure to said elongated tongue member and to said channel member to hold said elongated tongue member and said channel member in a fixed relationship and having a second position to release said elongated tongue member to allow said elongated tongue member to move relative to said channel member.

2. A tilt-bed trailer as in claim 1, wherein said gripper mechanism comprises:

an upper pressure member having first and second laterally extending shoulder portions, said upper pressure member also having at least one aperture therein;

a pair of downwardly extending spaced apart side members, each having an upper portion formed with an associated one of said first and second laterally extending shoulder portions, and each further having a lower portion formed as an inwardly extending hook element arranged to cooperate with an associated one of said ridges on said elongated tongue member.

3. A tilt-bed trailer as in claim 2, wherein said selectively actuatable pressure device comprises:

a threaded bolt having a first end portion and a second end portion extending through said aperture;

a threaded nut mounted on said second end portion; and an actuating handle mounted on said first end portion.

4. A tilt-bed trailer comprising:

frame means for supporting a load;

elongated tongue means having ridge means along a portion of the length of said elongated tongue means and said elongated tongue means including coupling means for a rotatable coupling said elongated tongue means to said frame means;

first means coupled to said frame means for cooperating with said elongated tongue means;

second means slidably coupled to and arranged for cooperating with said first means;

third means coupled to said second means for engaging said first means and for releasably gripping said ridge means on said elongated tongue means; and fourth means for selectively causing said third means to cooperate with said first means and said ridge means for causing said second means to be held in a selectable fixed relationship relative to said first means.

5. A tilt-bed trailer as in claim 4, wherein said fourth means includes fifth means for releasing said second means and said third means, for allowing said first means and said second means to move in relationship relative to each other to thereby release said elongated tongue means.

6. A tilt-bed trailer as in claim 5, wherein said third means and said fourth means are slidably moveable relative to said first means and said elongated tongue means for engaging said first means and said elongated tongue means in a first position and for releasing said first means from said elongated tongue means in a second position.

7. A tilt-bed trailer comprising:

a frame:

an elongated tongue member having ridges along at least a portion of its length;

a coupling device rotatable coupling said elongated tongue member to said frame;

a channel member coupled to said frame and arranged for cooperating with said elongated tongue member;

a gripper mechanism slidably engaged along said length of said elongated tongue member, said gripper mechanism including gripping portions for engaging said ridges on said elongated tongue member, and capable of engaging said channel member in a first position and capable of disengaging said channel member in a second position; and a selectively actuatable device coupled to said gripper mechanism and when in said first position is capable of causing said gripper mechanism to cause said channel member to be held in a predetermined position on said elongated tongue member when said selectively actuatable device is activated.

8. A tilt-bed trailer as in claim 7, wherein said gripper mechanism and said selectively actuatable device in combination include:

a pair of said spaced-apart gripping portions to cooperate with said ridges on said elongated tongue member;

a pressure member coupled to said pair of spaced-apart gripping portions; and a hand operable mechanism coupled to said pressure member to selectively apply force and remove force from said gripper mechanism.

9. A tilt-bed trailer as in claim 7, wherein said ridges are on opposite sides of said elongated tongue member; and said elongated tongue member has a predetermined width.

10. A tilt-bed trailer as in claim 9, wherein said channel member has a width to mate with said width of said elongated tongue member.

11. A tilt-bed trailer as in claim 10, wherein said spaced-apart gripping portions are sufficiently spaced to permit slidable engagement with said channel member.

* * * * *